United States Patent [19]

Urban, Jr.

[11] 4,256,723

[45] Mar. 17, 1981

[54] PROCESS FOR PREPARING PRECIPITATED RED IRON OXIDES

[75] Inventor: Eugene M. Urban, Jr., Trenton, N.J.

[73] Assignee: Cities Service Company, Tulsa, Okla.

[21] Appl. No.: 35,667

[22] Filed: May 3, 1979

[51] Int. Cl.$^2$ .............................................. C01G 49/06
[52] U.S. Cl. ..................................... 423/633; 106/304
[58] Field of Search ......................... 423/633; 106/304

[56] References Cited

U.S. PATENT DOCUMENTS

| | | | |
|---|---|---|---|
| 2,574,459 | 11/1951 | Bennetch | 423/633 X |
| 2,939,767 | 6/1960 | Martin | 423/633 |
| 3,845,198 | 10/1974 | Marcot | 423/633 X |
| 3,946,103 | 3/1976 | Hund | 423/633 |
| 3,974,267 | 8/1976 | Urban | 423/633 |
| 4,060,596 | 11/1977 | Nakamura | 423/633 |

*Primary Examiner*—Jack Cooper
*Attorney, Agent, or Firm*—George L. Rushton

[57] ABSTRACT

A precipitated red iron oxide, having high crystallinity, low acicularity, unifrom particle size, and purity of color, is produced by aerating an alkaline mixture of copperas and soda ash to form seed crystals, increasing the temperature, adding additional copperas, and aerating the mixture to form red oxide crystals of the desired color. The final color can vary from a light salmon to a dark maroon.

2 Claims, 3 Drawing Figures

PROCESS FOR PREPARING PRECIPITATED RED IRON OXIDES

BACKGROUND OF THE INVENTION

This invention concerns the manufacture of iron oxides. More particularly, it concerns a method of producing a crystalline, red iron oxide of low acicularity. The utility of the invention resides in the production of pigmentary iron oxides.

Iron oxide, either natural or synthetic, is a well-know pigment. Among the synthetic oxides are blacks, yellows, browns, tans, and reds. The black and brown oxides contain varying ratios of ferrous and ferric oxides. Yellow iron oxides are the monohydrate of ferric oxide ($Fe_2O_3.H_2O$) (also written as FeOOH). Tan oxides are iron oxide pigments in which iron oxide is reacted with another metallic oxide to form a series of chemical compounds known as ferrites. Synthetic red oxides can be made by four different methods. "Ferrite reds" are made by dehydrating the yellow oxide, thus converting the ferric oxide monohydrate to $Fe_2O_3$. Another method is to precipitate black or brown oxide and then calcine at red heat to the ferric oxide state. A third method makes roasted "copperas reds", by dehydrating copperas, ($FeSO_4.7H_2O$) to the monohydrate ($FeSO_4.H_2O$) amd then calcining the monohydrate to give red alpha $Fe_2O_3$ (copperas red). The fourth method gives what is often referred to as "precipitated reds", made by direct precipitation from a solution of ferrous salts. The present invention is concerned with an improvement in this last-mentioned method.

In U.S. Pat. No. 2,935,379 (Martin), brown gammma ferric oxide is digested in an acidic, aqueous suspension containing a soluble ferrous salt, this process forming red, non-magnetic, alpha ferric oxide (precipitated red). In U.S. Pat. No. 2,618,571, red iron oxide is obtained by oxidizing an alkaline suspension of ferrous carbonate containing zinc carbonate and/or aluminum hydroxide. In U.S. Pat. No. 2,620,261, red iron oxide is formed by precipitating brown ferric hydroxide in the presence of zinc or copper compound. In U.S. Pat. No. 2,618,532, red iron oxide is prepared by aerating an aqueous alkaline suspension of ferrous carbonate and magnesium carbonate. I found that these, and other similar methods of preparing precipitated reds, result in a mixture of iron oxide particles having acicular crystals and some not fully developed red iron oxide crystals. This nonuniformity of product results in poor color development.

SUMMARY OF THE INVENTION

I have found a way to prepare precipitated red iron oxides that contain reduced acicularity, improved uniformity, and enhanced crystalline development. My process has the serial steps of (a) adding, with agitation, an aqueous solution of a soluble iron salt to an aqueous solution containing an excess of a stoichiometric equivalent of a base selected from the hydroxides and carbonates of sodium and potassium, thus forming an insoluble iron compound, with the mixture having a pH of about 7.5 and a temperature of from about 55° C. to about 75° C. (131° F.-167° F.), (b) aerating the mixture with an oxygen-containing gas, at a rate of from about 0.001 to about 0.005 lbs. $O_2$/min./lb. of added iron salt, to oxidize the precipitate of step (a) to uniformly-sized and highly uncrystalline iron oxide seed particles, (c) aerating the mixture at the rate given in step (b) for a substantially complete reaction period of from about 1 to about 4 hours, at which time essentially all the ferrous iron has been converted to ferric iron, (d) increasing the temperature to a range of about 80°-90° C. (176°-194° F.), (e) adding additional soluble iron salt in an amount in excess of that required to react with the excess base present, thus lowering the pH of the mixture, (f) aerating the mixture of step (e) with an oxygen-containing gas, at a rate of about 0.0005 to about 0.001 lbs. $O_2$/min./lb. of total added iron salt, for a period of about 10-20 hours, thus reacting essentially all the precipitated ferrous iron to ferric iron, resulting in the formation of iron oxide crystals having a color of light salmon, a high crystallinity, a uniform particle size, and purity of color, and (g) growing the iron oxide crystals of step (f) to a darker shade of color, if so desired.

By using this process, precipitated reds are produced that have colors varying from light salmon to dark maroon, depending on crystal size, more uniform particle size, and "clean" colors, due to the reduced amount of undesirable iron oxide forms, such as acicular hydrated iron oxide.

BRIEF DESCRIPTION OF THE DRAWINGS

Black-and-white photographic reproductions are used to show the crystalline development of the seed crystals to the finished product.

DETAILED DESCRIPTION OF THE INVENTION

Figure 1:
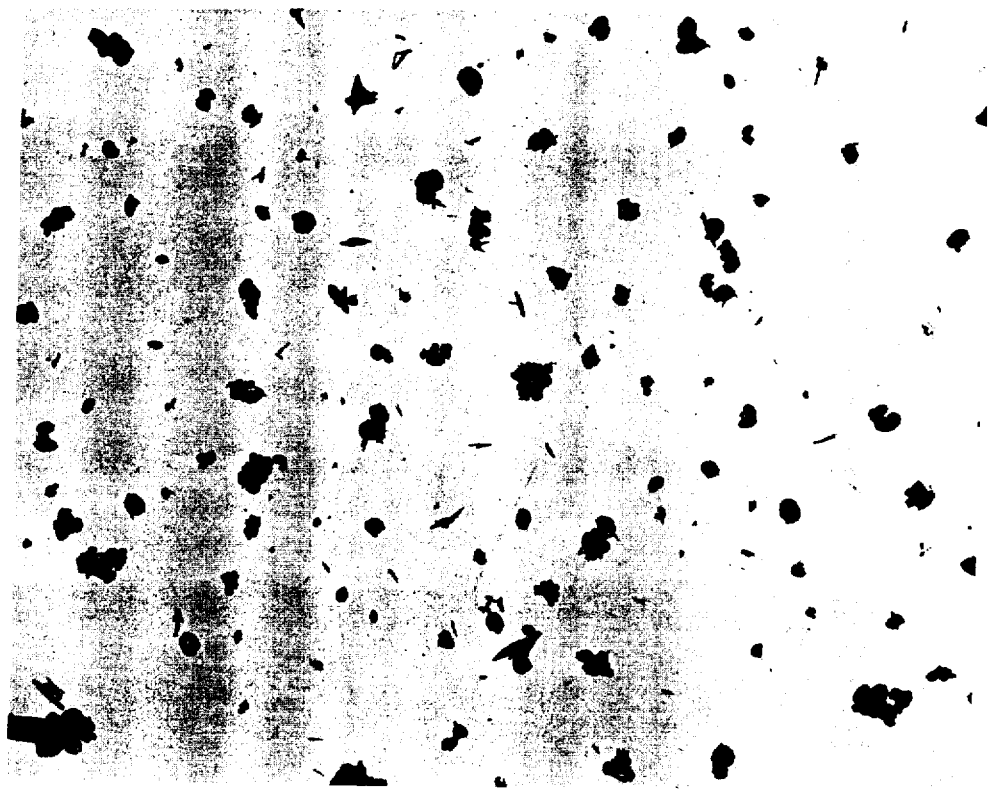
FIG. 1 is a photographic reproduction of seed crystals.

As is known in the pigmentary iron oxide industry, the preparation of precipitated red oxides involves the separate steps of seed formation and crystal growth. By introducing an intermediate step, which I call "conditioning", I believe that my improved process produces a precipitated red oxide that has improved color and crystallinity.

In the process of this invention, the soluble iron salts that are the raw material for the iron oxide product can by any of the available and known iron salts, such as ferrous sulfate and ferrous chloride. Copperas ($FeSO_4.7H_2O$) is a well-known soluble iron salt and is the preferred material. Depending on the industrial source of the copperas, the purity of the material is important to the product. I specifiy that the ferrous sulfate used in the process should have less than 0.05 wt.% $TiO_2$ and less than 0.1 wt.% in total metals, such as Mg, Mn, and Al. The ferrous sulfate solution used in this process may be prepared from commercial ferrous sulfate crystals, or a commercial solution of ferrous sulfate may be used. A saturated ferrous sulfate solution is conveniently used.

The base, or alkaline reagent, that is mixed with and reacts with the soluble iron salt solution is selected from the hydroxides and carbonates of sodium and potassium. Other alkaline metals can be used, but the sodium and potassium compounds are commercially available and offer a suitable alkaline environment. Due to their availability and lower costs, sodium hydroxide and sodium carbonate are preferred. Due to its stability in the reaction at the reaction temperature, sodium carbonate is the preferred reagent. Broadly, commercially available reagents of suitable purity are satisfactory for the process.

In preparing seed crystals of iron oxide, the aqueous solution of soluble iron salt is added, with agitation, to an aqueous solution of the alkaline reagent. More specifically, in my process, a copperas solution is added to a sodium carbonate solution, with the carbonate being in excess of the stoichiometric equivalent, such as from about 0.01 to about 0.5 lbs. excess carbonate/gal. of solution. The iron salt/water ratio can vary from about 0.5 to about 1.5. The pH of the mixed solution is about 7.5 and in this environment the soluble iron salts from insoluble iron compounds, such as $Fe(OH)_2$ or $FeCO_3$.

The temperature of the mixture is adjusted to the range of from about 55° C. to about 75° C. (131° F.–167° F.).

The above-described aqueous slurry of insoluble iron compound is aerated with an oxygen-containing gas at a rate of about 0.001 to about 0.005 lbs. of $O_2$/min./lb. of added iron salt. The oxygen-containing gas is exemplified by air. This aeration process usually provides sufficient agitation for the reaction. However, if the aeration agitation is insufficient, additional agitation means, such as air injection into a recirculating pump, can be used.

The reaction time for this seed formation step is preferably of the order of 1 to 4 hours. I have found that if the reaction time is much longer, such as for about 6 hours, the seeds produced are relatively larger, usually darker in color, and only produce darker shades of precipitated red iron oxide. By developing the seeds in a shorter period of time, I have found that the seeds are smaller, lighter in color, and have improved uniformity. By "uniform particle size" of the seed crystals, I mean that over 90% of the seeds fall into a given particle size range. During this reaction time of 1 to 4 hours, it is noted that the pH increases to approximately 9, due to excess base present.

Near the end of the stage of seed formation, the reaction mixture comprises precipitated red iron oxide seeds of uniform particle size, partially hydrated with water, trace amounts of yellow acicular iron oxide crystals, residual base (such as sodium carbonate), and water. The conditioning step that I propose is an attempt to convert or react the yellow oxide to the red oxide, thereby reducing to a minimum the number of acicular oxide crystals and improving the uniformity and crystallinity of the ultimate red iron oxide crystals. Briefly, the conditioning stage includes raising the temperature, reducing the pH, and aerating for a time period sufficient to result in improved quality of seed crystals.

The reaction temperature is raised to about 80°–90° C. (176°–194° F.).

Additional copperas solution is added to the slurry of seed crystals, in sufficient amounts to react with the excess base and establish an excess $FeSO_4$ concentration of about 0.01 to 0.4 lbs./gal. When this additional soluble iron salt is added to the slurry that has a pH of approximately 9, the pH drops to about 6, and a precipitate of black FeO is formed. This black precipitate, in combination with the red oxide crystals and the yellow oxide crystals, forms a brown-black slurry mixture.

After the acidic copperas solution is added to the seed slurry, the pH is further lowered, preferably at a slow rate, by air oxidation. Aeration, at a rate of about 0.0005–0.001 lbs. $O_2$/min./lb. of the additional iron salt (which rate is lower than that found in the steps involving the formation of seed crystals), is continued, to change the ferrous material to the ferric state. The aeration period can vary from about 10 to about 20 hrs. During this time the pH slowly changes to a value of about 4.0. Since the ferrous iron precipitate reacts, the color of the slurry mixture changes from a brown to a light red. During this time, the crystallinity of the red seeds is improved. The end point for the conditioning stage is when the pH has a value of about 3 to 4, the light red color is present, and there is a slight amount of unreacted copperas present.

The last stage in the preparation concerns the growth of the conditioned seed crystals to develop the desired color, the conditioned crystal being the lightest shade. Broadly, there are known and accepted methods of growing seed crystals, such as the Penniman-Zoph (Scrap Iron) Process described in U.S. Pat. No. 1,327,061, and the Martin (Ammonia) Process described in U.S. Pat. No. 2,939,767. These patents are incorporated by reference to illustrate the growth step in the ultimate production of precipitated red iron oxide crystals.

Conditioned seed crystals have a particular size, shape and color. This color is the lightest that will appear before the growth step. If this is the desired color, further growth is not necessary. If a darker shade is desired, conditioned seed crystal can be grown larger, during which growth period the color darkens.

As is recognized in the pigmentary iron oxide industry, many of the characteristics of the grown crystals of iron oxide are based upon the characteristics of the seeds from which mature crystals are grown. Thus, by my improved process of producing seeds and conditioning these semi-crystalline seeds to a crystalline state, the resultant crystals have improved characteristics, such as improved color and dispersing properties due to improved crystallinity and uniformity of particle size. As mentioned above, the absolute color of the resultant mixture, after growth is finished, can vary from light salmon to dark maroon. These colors are characteristic of the finished size of the crystal and may be varied by means known in the art. My method does allow the process for making a variety of red colors, depending on the end use.

After the end of the growth stage, the finished crystals are separated from the slurry, such as by filtration and washing, and dried and milled to give the industrial product.

The following examples illustrate (a) a prior art method of preparing precipitated reds (U.S. Pat. No. 3,009,821) and (b) the invention. The latter should not be interpreted as to limits for the parameters, since many variations are possible in the process without departing from the spirit or scope thereof.

EXAMPLE I

In a suitable reaction vessel, 1900 lbs. of caustic soda were dissolved in water to make 4500 gals. of solution. In another vessel, 6600 lbs. of copperas were dissolved in water to make 4500 gals. of solution. There is practically one equivalent of alkali per equivalent of iron salt.

The copperas solution was pumped, with agitation, into the caustic solution. The resultant ferrous hydroxide slurry was oxidized by blowing air, at room temperature, into the reaction vessel, to form colloidal iron oxide seed (the starting material for the ultimate precipitated red oxide product). FIG. 1 is an electron micrograph of representative seeds.

The seed was processed by heating to 50° to 100° C. (preferably 70°-80° C.) and adding copperas solution to establish a soluble iron concentration of 0.1-0.5 lb./gal., adding metallic iron, and blowing air through the processing vessel until the initial seed material has matured and grown to the desired shade of precipitated red iron oxide. Aeration was continued from about 24 hours (to give a light shade of red oxide) to about 6-7 days (to give a deep maroon oxide).

The pigment particles were removed by centrifugation, washed, dried, and milled to give the final product.

Figure 2:
FIG. 2 is a photographic reproduction of a finished precipitated red iron oxide produced by a prior art process, showing the presence of undesirable iron oxide particles such as acicular hydrated iron oxides.

FIG. 2 shows the finished iron oxide particles, using the above process. Note the presence of acicular particles.

EXAMPLE II

To a 1500 gal. reactor were charged 475 gal. water, and the temperature of the reactor was raised to 50° C. Then 840 lbs. of USP $Na_2CO_3$ (soda ash) were added to the reactor, with agitation. Copperas solution (525 gal. of solution containing about 2.0 lbs. $FeSO_4.7H_2O$/gal.) was then added to the mixture, at a rate of about 100 gal./min., with agitation. The reactor temperature was then raised to 70° C. A precipitate of ferrous iron was formed, and this precipitate was oxidized by an air stream, injected into the downstream side of a recirculating pump at a rate of between 60 and 300 scfm. When the aeration was substantially complete and practically all of the ferrous iron was converted to ferric iron, the pH was about 9.5.

For the conditioning stage, the reactor temperature was raised to 90° C. Then 200 gal. of copperas solution (2.0 lb. $FeSO_4.7H_2O$/gal.) were added to the reactor, with agitation, resulting in a pH drop to about 6.5 and the formation of a dark-brown or brown-black colored precipitate.

Using an open-pipe sparger, air was introduced into the reactor at the rate of about 15-30 scfm for about 20 hours, at the end of which time the pH was about 4.0, and the reactor mixture contained a slight excess of $FeSO_4$. The iron oxide product at this time had a light salmon-red color. Since this was the desired light color, the oxide particles were filtered, washed, and dried.

Figure 3:
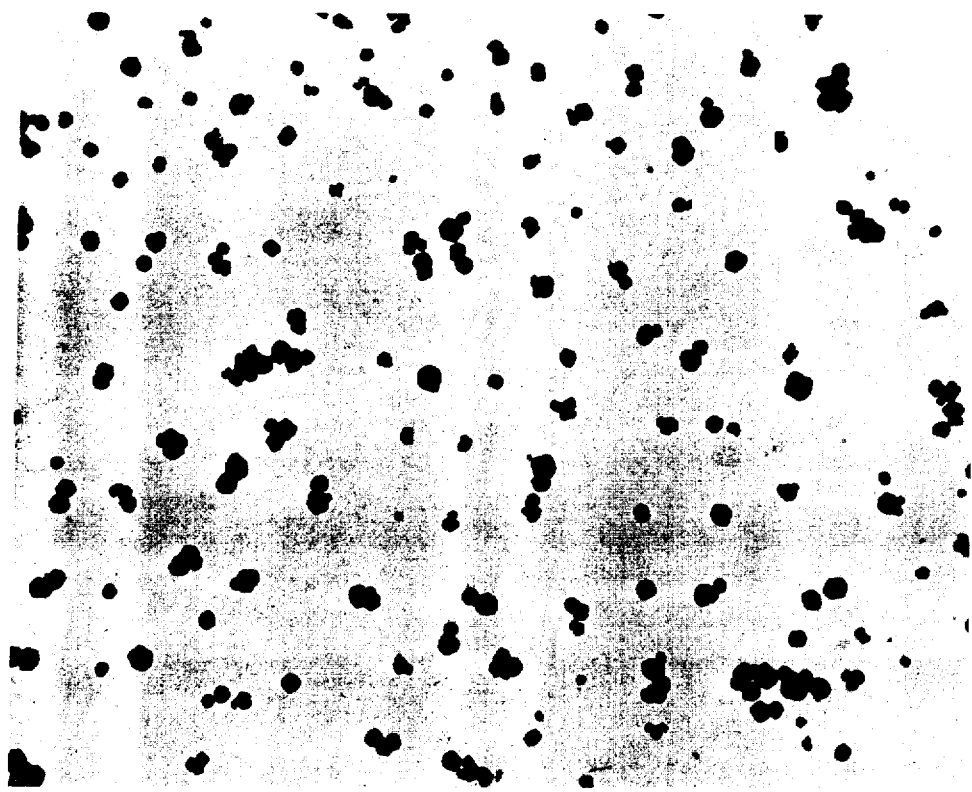
FIG. 3 is a photographic reproduction of the finished oxide produced by the process of the present invention showing uniformly-shaped particles.

FIG. 3 shows the finished iron oxide produced by the present invention. Note the essential absence of acicular particles. Such a product has a high crystallinity and uniform particle size, leading to purity of color that is a distinct improvement over the prior art.

I claim:

1. A process for the preparation of red iron oxide crystals containing a minimum of acicular yellow iron crystals, said process comprising the serial steps of:
    (a) adding, with agitation, an aqueous solution of a soluble ferrous salt to an aqueous solution containing an excess of a stoichiometric equivalent of a base selected from the hydroxides and carbonates of sodium and potassium, thus forming an insoluble iron compound, with the mixture having a pH of about 7.5 and a temperature of from about 55° C. to about 75° C. (131° F.-167° F.),
    (b) aerating the mixture with an oxygen-containing gas, at a rate of from about 0.001 to about 0.005 lbs. $O_2$/min./lb. of added ferrous salt, to oxidize the precipitate of step (a) to uniformly-sized and highly uncrystalline iron oxide seed particles,
    (c) aerating the mixture at the rate given in step (b) for a substantially complete reaction period of from about 1 to about 4 hours, at which time essentially all the ferrous iron has been converted to ferric iron, and the pH has increased to approximately 9,
    (d) increasing the temperature to a range of about 80°-90° C. (176°-194° F.),
    (e) adding additional soluble ferrous salt in an amount in excess of that required to react with the excess base present, thus lowering the pH of the mixture from approximately 9 to about 6,
    (f) aerating the mixture of step (e) with an oxygen-containing, gas, at a rate of about 0.0005 to about 0.001 lbs. $O_2$/min./lb. of additional iron salt from step (e), for a period of about 10-20 hours, thus converting essentially all the precipitated ferrous iron to ferric iron, resulting in the formation of iron oxide crystals having a color of light salmon, a low acicularity, a high crystallinity, a uniform particle size, and purity of color, and the reduction of the pH to about 4
    (g) and optionally growing the iron oxide crystals of step (f) to a darker shade of color.
2. The process of claim 1 wherein
    (a) the soluble ferrous salt is copperas ($FeSO_4.7H_2O$),
    (b) the base is sodium carbonate,
    (c) the oxygen-containing gas is air, and
    (d) the aeration of step (b) is done by injection of air into a recirculating pump.

* * * * *